US012061367B2

(12) United States Patent
Cardarelli et al.

(10) Patent No.: US 12,061,367 B2
(45) Date of Patent: Aug. 13, 2024

(54) APPARATUS ARRANGED FOR ALIGNING AN OPTICAL COMPONENT WITH AN ON-CHIP PORT AS WELL AS A CORRESPONDING SYSTEM AND METHOD

(71) Applicant: Technische Universiteit Eindhoven, Eindhoven (NL)

(72) Inventors: Simone Cardarelli, Eindhoven (NL); Nicola Calabretta, Eindhoven (NL); Marco Fattori, Eindhoven (NL); Ripalta Stabile, Eindhoven (NL); Kevin Aubrey Williams, Eindhoven (NL)

(73) Assignee: Technische Universiteit Eindhoven, Eindhoven (NL)

( * ) Notice: Subject to any disclaimer, the term of this patent is extended or adjusted under 35 U.S.C. 154(b) by 0 days.

(21) Appl. No.: 17/642,042

(22) PCT Filed: Sep. 14, 2020

(86) PCT No.: PCT/NL2020/050568
§ 371 (c)(1),
(2) Date: Mar. 10, 2022

(87) PCT Pub. No.: WO2021/049942
PCT Pub. Date: Mar. 18, 2021

(65) Prior Publication Data
US 2022/0382002 A1 Dec. 1, 2022

Related U.S. Application Data

(60) Provisional application No. 62/899,346, filed on Sep. 12, 2019.

(51) Int. Cl.
*G02B 6/42* (2006.01)
*G02B 7/00* (2021.01)

(52) U.S. Cl.
CPC ........... *G02B 6/4226* (2013.01); *G02B 7/005* (2013.01)

(58) Field of Classification Search
CPC .............................. G02B 7/005; G02B 6/4226
See application file for complete search history.

(56) References Cited

U.S. PATENT DOCUMENTS

| | | | |
|---|---|---|---|
| 6,445,858 B1 * | 9/2002 | Musk | G02B 6/4226 385/52 |
| 7,095,915 B2 * | 8/2006 | Dames | G02B 6/3504 385/33 |

(Continued)

FOREIGN PATENT DOCUMENTS

WO    WO 02/103816    12/2002

OTHER PUBLICATIONS

International Search Report & Written Opinion, dated Nov. 24, 2020, 9 pages.

(Continued)

*Primary Examiner* — Sung H Pak
(74) *Attorney, Agent, or Firm* — Casimir Jones, S.C.; Robert A. Goetz

(57) ABSTRACT

An apparatus arranged for deflecting an optical component for alignment purposes of the optical component with a further optical component, wherein the apparatus comprises a plurality of adjacently placed elongate carriers, extending mutually parallel to each other in a longitudinal direction, wherein two adjacently placed elongate carriers have a spacing between them for receiving a first optical component such that the received optical component rests against two adjacently placed elongate carriers, wherein the two elongate carriers have slopes such that the spacing between the two adjacently placed elongate carriers is smaller at a bottom side compared to the spacing at a top side of the carriers, wherein the carriers comprise piezoelectric material (Continued)

configured to deflect the carriers in a direction perpendicular to the longitudinal direction by actuating the piezoelectric material.

16 Claims, 3 Drawing Sheets

(56) References Cited

U.S. PATENT DOCUMENTS

| | | |
|---|---|---|
| 2003/0128912 A1 | 7/2003 | Dames et al. |
| 2003/0217476 A1* | 11/2003 | Law .................... G02B 6/4234 33/645 |
| 2014/0185983 A1 | 7/2014 | Sandhu et al. |
| 2015/0212277 A1 | 7/2015 | Guidotti et al. |

OTHER PUBLICATIONS

Aoshima S. et al. "Compact mass axis alignment device with piezoelements for optical fibers" IEEE Photonics Thechnology Letters, IEEE Service Center, NJ, US, vol. 4, No. 5, May 1, 1992, pp. 462-464.

* cited by examiner

APPARATUS ARRANGED FOR ALIGNING AN OPTICAL COMPONENT WITH AN ON-CHIP PORT AS WELL AS A CORRESPONDING SYSTEM AND METHOD

TECHNICAL FIELD

The present disclosure is directed to photonic assembly/testing and, more specifically, to a method of aligning an optical component with an on-chip port.

BACKGROUND

Photonic packaging is the assembly procedure which allows optical chips to be encapsulated in reliable protection packages providing electrical and optical interfaces between the photonic chip and the user. Photonic packaging can rely on the experience of the electronics industry to successfully implement several assembly functions, however, the optical connection between functional optical components requires submicron-scale alignment and represents a new critical assembly challenge.

Optical fibers are often used to create connectivity between different optical chips/modules. The efficient connection between a single on-chip port and an optical fibre requires submicron scale and controlled alignment, commonly performed by means of micro-manipulators. Connectivity with a photonic chip with multiple ports can be established through an array of optical fibers, which is commercially available as a single device containing pre-aligned optical fibres.

Efficient alignment between the on-chip ports (perfectly aligned) and the array of optical fibers is compromised by the imperfect position of each fiber core in the array, therefore, alternative solutions are required. This motivates the investigation of efficient methods for the alignment of multiple optical fibres with multiport photonic chips.

SUMMARY OF THE INVENTION

It would be advantageous to achieve an apparatus for aligning an optical component with a further optical component.

In a first aspect, there is provided an apparatus arranged for deflecting an optical component for alignment purposes of the optical component with a further optical component, wherein the apparatus comprises a plurality of adjacently placed elongate carriers, extending mutually parallel in a longitudinal direction, wherein two adjacently placed elongate carriers have a spacing between them for receiving a first optical component such that the received optical component rests against two adjacently placed elongate carriers, wherein these two elongate carriers have slopes such that the spacing between these two adjacently placed elongate carriers is smaller at a bottom side compared to the spacing at a top side of the carriers, wherein the carriers comprise piezoelectric material such that the carriers can be deflected in a direction perpendicular to the longitudinal direction by actuating the piezoelectric material.

The above is thus related to a piezoelectric system which enables simultaneous and two dimensional alignment of optical components like optical fibers, mechanically independently. The piezoelectric system may, for example, consist of an array of bimorph piezoelectric cantilevers with a pitch of 250 μm, which can be independently controlled. Two adjacent cantilevers are employed to achieve two dimensional alignment of a single optical fiber. Alignment is achieved by electronically deflecting, through for example voltage based effects, the tips of the two cantilevers.

In accordance with the present disclosure, the two adjacently placed elongate carriers have a spacing between them for receiving the optical component such that the received optical component rests against the two adjacently placed elongate carriers. This is accomplished by the features that the two elongate carriers have slopes such that the spacing between these two adjacently placed elongate carriers is smaller at the bottom side compare to the spacing at the top side.

In other words, the wall of a carrier is not, in use, completely vertical. The wall may be construed in such a way that the width of the carrier varies gradually from the top side to the bottom side. This has the effect that a received optical component can be displaced, horizontally, vertically, and diagonally, by moving the corresponding carriers independently.

Two options exist for moving the received optical component.

First, the carriers may be deflected, independently from each other, in a vertical direction. Second, the carriers may be deflected, independently from each other, in a horizontal direction.

For example, deflecting the carriers towards each other has the effect that the received optical component is moved upwards. Deflecting both carriers to one side has the effect that the received optical component is moved to that particular side. Deflecting the carriers away from each other has the effect that the received optical component is moved downwards.

In other words, in an example, a piezoelectric system may be provided, which enables simultaneous and two-dimensional alignment of optical fibers, mechanically independent and, for example, spaced by 500 μm. According to one example, a piezoelectric system is provided that includes an array of bimorph piezoelectric cantilevers, being the carriers, with a pitch of 250 μm, which can be independently controlled.

Two adjacent cantilevers are employed to achieve two-dimensional alignment of a single optical fiber. Each optical fiber is placed between the tips of two adjacent piezoelectric cantilevers, which can be electronically deflected, through voltage based effects, to push the optical fiber. When voltage is applied between the top and bottom surfaces of a piezoelectric cantilever, bending of the cantilever and subsequent deflection of the free standing tip occur by piezoelectric effects in a bimorph structure.

All the employed piezoelectric cantilevers may have a bottom and a top electrode. The bottom electrodes may electrically be connected through short circuit while the top electrodes are electrically insulated and can be independently controlled and contacted through either an electrical probe array or wire bonding.

It is noted that the piezoelectric materials may be broadly classified as crystalline, ceramic and polymeric piezoelectric materials. The carriers may thus comprise piezoelectric ceramics being lead zirconate titanate, PZT, barium titanate and lead titanate.

It is further noted that the apparatus is directed to the alignment process of aligning an optical component with a further optical component. For example, a particular optical fibre may be aligned with an on-chip port, wherein the optical fibre is received in a space between two carriers. Another option is that an optical lens is aligned with an on-chip port of an integrated circuit, IC. Yet another option is that two optical fibres are aligned with each other. In the latter, even two apparatuses may be used, one for each optical fibre, which is explained in more detail later below.

It is even further noted that the received optical component, for example an optical fibre, may protrude, i.e. extent, from the carriers itself, in the longitudinal direction. The optical fibre may thus stick out. This has the beneficial effect that the carrier may be adequately fixated using the portion that sticks out from the apparatus.

In an example, the two elongate carriers have slopes such that the side walls of these two adjacently placed elongate carriers form a V- or curved shaped groove supporting the received optical component. The side wall of a carrier may be formed such that the thickness of the carrier gradually reduces from bottom side to top side, thereby enabling a received optical fibre to be moved in two dimensions.

In an example, each of the elongate carriers has a slope of between 8-50 degrees.

Ideally, the carriers may have a slope of around 45 degrees to ensure that there is quite a bit of freedom of movement in both the horizontal and vertical direction. This further reduces the frictional resistance that a received optical component experiences.

In a further example, the elongate carriers are smoothened for reducing frictional resistance between the received optical component and the corresponding elongate carriers.

In the context of this disclosure, smoothening may encompass different steps. For example, the elongate carriers may be coated with a smoothening material for reducing frictional resistance between the received optical component and the corresponding elongate carriers. Another option is that the elongate carriers are polished. Yet another option is that the elongate carriers are exposed to a chemical process for increasing the smoothness thereof.

In other words, the smoothening step may encompass reducing the surface roughness of the carriers, wherein the surface roughness may be defined as the measure of the finely spaced micro-irregularities on the surface texture.

The above described smoothening material may be any of a silicon nitride material, or a silicon dioxide material, or any insulating material which can be deposited through chemical deposition or sputtering techniques.

In a further example, the carriers can be deflected in the direction perpendicular to the longitudinal direction by applying a voltage to the carriers.

That is, the carriers can be deflected in the direction perpendicular to the plane on which the carriers are resting by applying a voltage to the carriers.

In a further example, two adjacently placed elongate carriers have a spacing between them for receiving the optical component being any of an optical fibre and an optical lens.

The inventors have found that multiple types of optical components may be aligned with the on-chip port, like an optical fibre and an optical lens.

The spacing between adjacently placed elongate carriers may between 100-400 µm.

The advantage hereof is that the spacing may be tailored to the spacing of the ports of an integrated circuit.

The length of the carriers, seen in the longitudinal direction, may be between 1 cm-5 cm.

The apparatus may, for example, comprise a base part, wherein each of the carriers extent, from the base part, in the longitudinal direction. The apparatus may resemble a comb, wherein the carriers are not directly connected to each other at their tips for ensuring that the carriers are able to deflect independently from each other. The carriers may be connected to each other at the other end, via a base part. The length of the carriers may be somewhere between 1 cm-5 cm such that the required deflection in the direction perpendicular to the longitudinal direction may be obtained.

In a further example, each of the elongate carriers has a side wall slope resembling any of:
  a linear slope;
  a curved slope; and
  a step shaped slope.

In another example, adjacently placed elongate carriers have a spacing between them for receiving the optical component such that the received optical component rests against two adjacently placed elongate carriers, and wherein the spacing between the next adjacently placed elongate carrier is free from receiving an optical component.

In accordance with the invention, the optical component may be received in the space between two adjacent carriers. However, the apparatus is also foreseen for the embodiment that a fibre is placed on top of the carrier. In that particular case, the fibre can be moved in one direction only, i.e. only horizontally or vertically. This, because in such a way it's not possible to utilize the slope of the side wall of a carrier for deflecting the optical fibre in a second direction.

The advantage of the above is that the pitch, i.e. the distance between subsequent carriers, can be reduced allowing the apparatus to be used in more versatile situations.

In a second aspect, there is provided a system for aligning an on-chip port of a first chip with an on-chip port of a second chip, wherein the system comprises:
  a first apparatus in accordance with any of the previous examples for aligning the on-chip port of the first chip with a first optical component;
  a second apparatus in accordance with any of the previous examples for aligning the on-chip port of the second chip with a second optical component, such that the on-chip port of the first chip is aligned with the on-chip port of the second chip via the respective first and second optical components.

It is noted that the advantages as disclosed with the first aspect of the disclosure, being the apparatus, are also applicable to the second aspect of the disclosure, being the system.

In a third aspect, there is provided a method for aligning an optical component with an on-chip port using an apparatus in accordance with any of the previous examples, wherein the method comprises the steps of:
  receiving, in a space between two adjacently placed elongate carriers, an optical component;
  deflecting the two adjacently placed elongate carriers for aligning the optical component with an on-chip port by actuating the piezoelectric material of the two adjacently placed elongate carriers.

In an example, the step of deflecting comprises:
  deflecting the two adjacently placed elongate carriers for aligning the optical component with an on-chip port by applying voltage to the piezoelectric material of the two adjacently placed elongate carriers.

In a further example, the elongate carriers are coated with a smoothening material for reducing frictional resistance between the received optical component and the corresponding elongate carriers.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
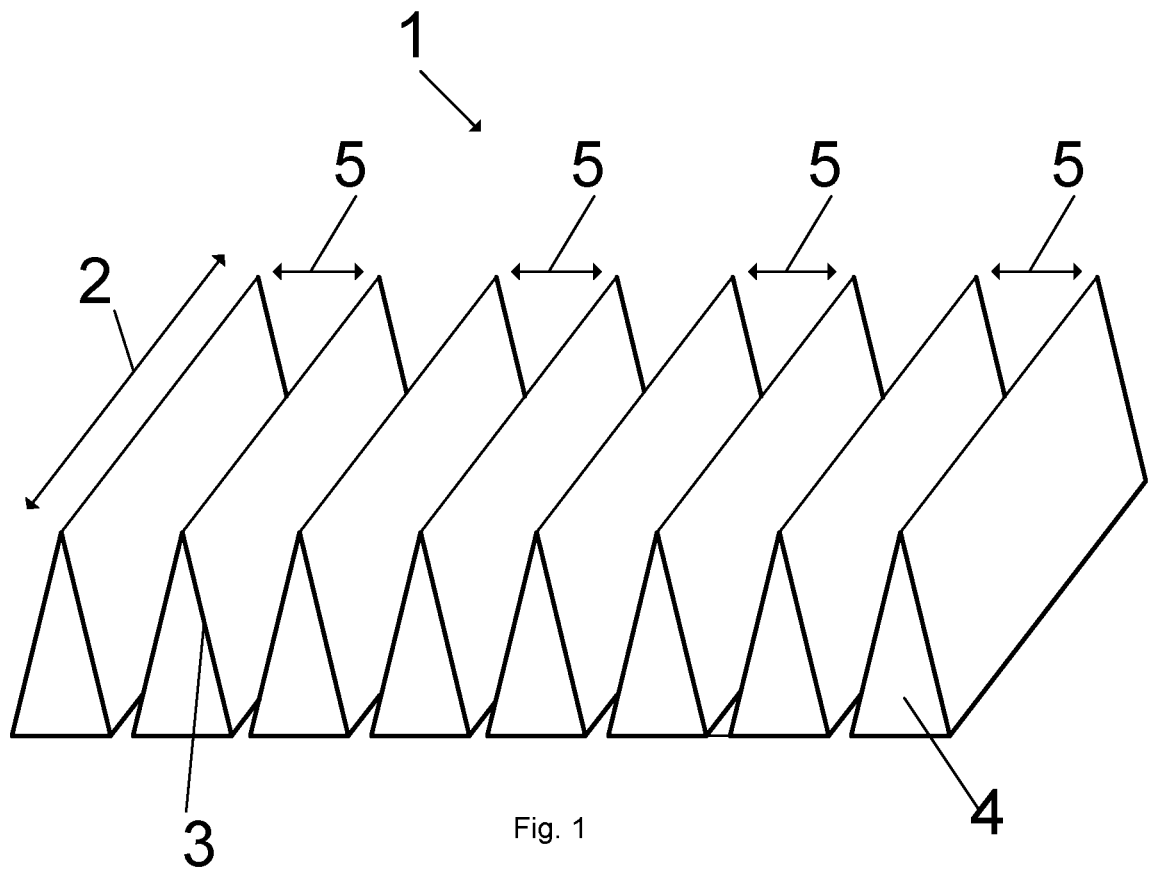
FIG. 1 discloses a view of an apparatus in accordance with the present disclosure.

FIG. 1 discloses a view of an apparatus 1 in accordance with the present disclosure.

The apparatus 1 is arranged for aligning an optical component like an optical lens or an optical fibre with an on-chip port. This is explained in more detail with respect to FIG. 3.

The apparatus comprises a plurality of adjacently placed elongate carriers 4, extending mutually parallel in a longitudinal direction, wherein two adjacently placed elongate carriers have a spacing 5 between them for receiving the optical component such that the received optical component rests against two adjacently placed elongate carriers.

The elongate carriers have slopes 3 such that the spacing between these two adjacently placed elongate carriers is smaller at a bottom side compared to the spacing at a top side of the carriers, wherein the carriers comprise piezoelectric material such that the carriers can be deflected in a direction perpendicular to the longitudinal direction by actuating the piezoelectric material.

The carriers may be deflected, preferably, in an upwards and downwards direction. Alternatively, the carriers may be deflected in a sideways direction. Both options are possible in accordance with the invention, and both realize the technical effect as discussed above.

According to an example, the carriers are piezoelectric cantilevers and are 2 cm long, as denoted with reference numeral 2, to achieve large deflection with a relatively low voltage. The longer the cantilevers, the larger the alignment tolerances on the coarse alignment between chip and the optical components like the optical fibres.

For an actuator length of 1 cm, 2 μm horizontal tuning range may be achieved with a maximum applied voltage of 50 V, which would still enable fine fibre-to-chip alignment after a coarse initial positioning through standard pick and place tools, linear motors or step motors. Shorter cantilevers can be employed if a higher maximum voltage can be applied, paying attention not to compromise the material polarization.

The cantilevers may be spaced by 250 μm, i.e. the spacing 5 may be 250 μm, to enable high density fibre alignment. A smaller pitch can be addressed by redesigning the geometry of the piezoelectric cantilevers through a rhombus shaped cross-section, or by milling micro-cantilevers from a thinner piezoelectric plate, or by employing processing techniques typically used to process micro-electromechanical systems (MEMS).

Two piezoelectric cantilevers are employed to move one optical fibre in two-dimensions. The micro-piezoelectric cantilevers are expected to work in parallel to independently control the position of multiple optical fibres, at the same time.

It is noted that the apparatus may be manufactured from a single layer stack, which makes the apparatus attractive from a fabrication point of view. This type of processing is considered to be monolithic since a single substrate is involved in the fabrication. The actuator can be processed either by a pulsed laser source, or through etching techniques, or anything alike. The possibility of realizing the embodiment through etching techniques is attractive to produce actuators through a wafer scale process, which may enable a low cost actuator and high volume fabrication.

Figure 2:
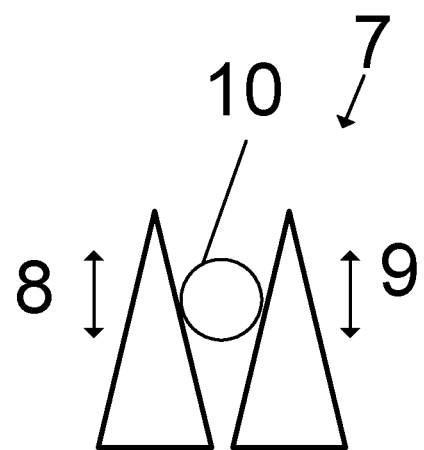
FIG. 2 discloses a cross section of two adjacently located carriers having received an optical fibre in between them.

FIG. 2 discloses a cross section 7 of two adjacently located carriers having received an optical fibre in between them.

The cross-section of a single carrier resembles a triangle. The carrier on the right hand side may be moved up and down 9. The carrier on the left hand side may be moved up and down 8 as well, independently from the carrier at the right hand side. This allows the fibre 10 to be moved across a two-dimensional space such that it can be aligned with the on-chip port.

The optical fibre 10 is thus placed between the two carriers, i.e. piezoelectric cantilevers, which can be independently controlled in the vertical direction 8, 9. Vertical displacement of the optical fiber can be achieved by actuating both the cantilevers towards the same direction. Horizontal displacement of the fiber is enabled by actuating the piezo-cantilevers towards opposite directions. Diagonal displacement of the fiber is enabled by actuating the piezo-cantilevers by different vertical displacements. A two-dimensional trajectory of the optical fiber is possible by tuning the voltage applied to the piezo-cantilevers.

Figure 3:
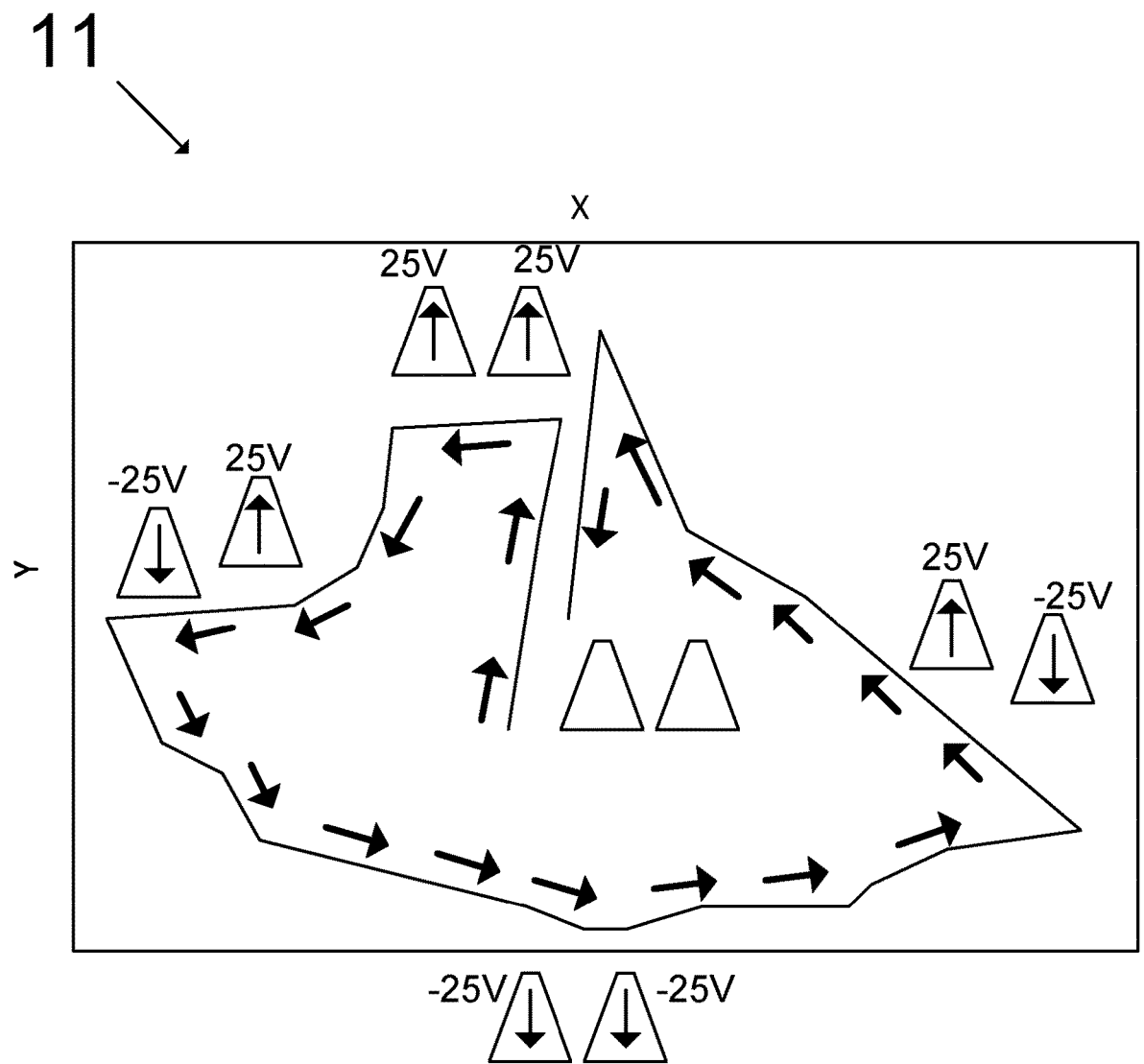
FIG. 3 discloses a measured two dimensional trajectory of an optical component when the carriers are actuated.

FIG. 3 shows a two dimensional trajectory, and the schematic position of the piezo-actuators at the vertices of the trajectory. The presented graph is directed to a tuning range of 4.4 μm and 30 μm in the horizontal and vertical direction, respectively, and with a maximum applied voltage of 50 V. The maximum applied voltage value is set by the piezoelectric datasheet. A lower maximum voltage can be employed if a smaller alignment tuning range of the optical fibre is needed.

According to one example, the disclosure relates to alignment of multiple optical fibres to multiport photonic chips. After alignment, the optical fibres are fixed by, for example, applying adhesive from the opposite side with respect to the piezo-actuators. Fixation is also possible from the bottom side if the tip of the fibre slightly protrudes out of the carriers. After fixing the fibres, the actuators may be deactivated and used for the next alignment. Alignment in multiple steps can be performed to reduce misalignment effects due to adhesive shrinkage.

In a further example, an array of 26 piezoelectric bimorph cantilevers, with 250 μm pitch is provided, and the cantilevers can be independently controlled. Measurements of the displacement of a single optical fiber have shown horizontal and vertical displacement of 4.4 μm and 30 μm respectively, by controlling two piezoelectric cantilevers with a maximum applied voltage of 50 V. A different actuation range can be achieved with the same maximum applied voltage by re-designing the geometry of the piezoelectric cantilevers.

The alignment method of the current invention enables fast chip assembly of multiport chips, which could be exploited by companies needing photonic chips assembling in a high volume and with low cost. The invention represents an attractive solution for assembling of photonic chips employed in several applications ranging from DATACOM, LIDAR, space, to sensing. Furthermore, this method may enable concepts for photonic assembling at wafer scale, which would be revolutionary for the photonic manufacturing industry.

Figure 4A:
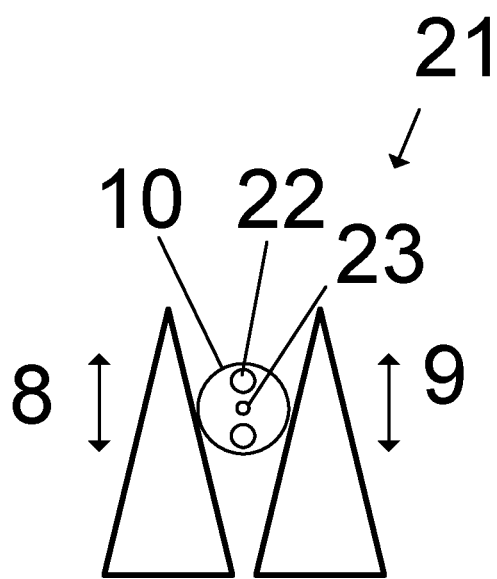
FIG. 4a and FIG. 4b disclose an example of how the apparatus may be used for rotating a fibre.
Figure 4B:
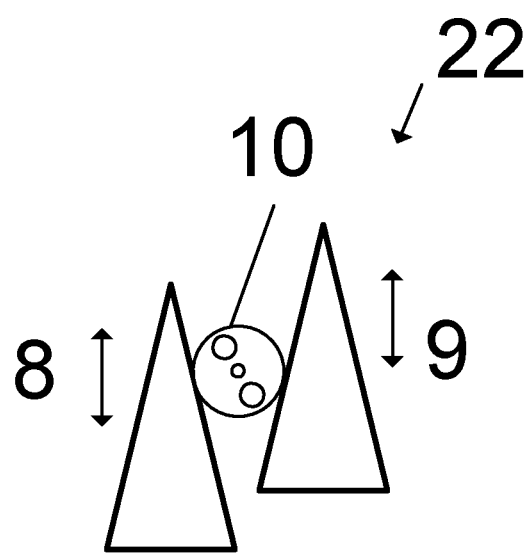

FIG. 4a and FIG. 4b disclose an example 21-22 of how the apparatus may be used for rotating a fibre.

The example shown in FIG. 4a is similar to the example shown in FIG. 2. In this particular example it is shown that the optical fibre comprises stress rods 22 as well as a core 23. The core 23 is used for guiding the optical waves through the fibre.

The apparatus may thus be used to rotate an optical fibre 10 along the light propagation axis. Several photonic chips require connectivity with polarization maintaining optical fibres (PANDA, bow-tie, or elliptical), for which the fibre rotation is to be controlled during the fibre-to-chip fixation. The concept explaining the rotation mechanism through the proposed piezo actuator is shown in the FIGS. 4a and 4b.

The optical fibre 10 is placed in between two piezo actuators, i.e. carriers, as shown in FIG. 4a. A PANDA optical fibre is considered for this example even though the principle can be applied to any kind of optical fibre (single mode, multimode, POF etc). The circle having reference numeral 22 represents the stress rod of the fibre 10, the circle having reference numeral 23 is the fibre core. A rotation of the optical fibre 10 is achieved by vertically controlling the two piezo actuators towards opposite vertical directions, as shown in FIG. 4b.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. An apparatus arranged for deflecting an optical component for alignment purposes of the optical component with a further optical component, wherein the apparatus comprises a plurality of adjacently placed elongate carriers, extending mutually parallel to each other in a longitudinal direction, wherein two adjacently placed elongate carriers have a spacing between them for receiving a first optical component such that the received optical component rests against two adjacently placed elongate carriers, wherein the two elongate carriers have slopes such that the spacing between the two adjacently placed elongate carriers is smaller at a bottom side compared to the spacing at a top side of the carriers, wherein the carriers comprise piezoelectric material configured to deflect the carriers in a height direction of the carriers that extends from the bottom side to the top side of the carriers, by actuating the piezoelectric material.

2. The apparatus of claim 1, wherein these two elongate carriers have slopes such that the side walls of these two adjacently placed elongate carriers form a V- or curved shaped groove supporting the received optical component.

3. The apparatus of claim 1, wherein each of the elongate carriers has a slope of between 8-50 degrees.

4. The apparatus of claim 1, wherein each elongate has a smooth surface for reducing frictional resistance between the received optical component and the corresponding elongate carriers.

5. The apparatus of claim 1, wherein each elongate carrier comprises a coating including a smoothening material for reducing frictional resistance between the received optical component and the corresponding elongate carriers.

6. The apparatus according to claim 4, wherein the smoothening material is any of:
a silicon nitride material;
a silicon dioxide material;
any insulating material which can be chemically deposited or sputtered.

7. The apparatus of claim 1, wherein the carriers are arranged to deflect in the direction perpendicular to the longitudinal direction by applying a voltage to the carriers.

8. The apparatus of claim 1, wherein two adjacently placed elongate carriers have a spacing between them for receiving the optical component being any of an optical fibre and an optical lens.

9. The apparatus of claim 1, wherein the spacing between adjacently placed elongate carriers is between 100-400 μm.

10. The apparatus of claim 1, wherein a length of the carriers, seen in the longitudinal direction, is between 1 cm-5 cm.

11. The apparatus of claim 1, wherein each of the elongate carriers has a slope conforming any of:
a linear slope;
a curved slope; and
a step shaped slope.

12. The apparatus of claim 1, wherein two adjacently placed elongate carriers have a spacing between them for receiving the optical component such that the received optical component rests against two adjacently placed elongate carriers, and wherein the spacing between the next adjacently placed elongate carrier is free from receiving an optical component.

13. A system for aligning an on-chip port of a first chip with an on-chip port of a second chip, wherein the system comprises:
a first apparatus in accordance with any of the previous claims for aligning the on-chip port of the first chip with a first optical component;
a second apparatus in accordance with any of the previous claims for aligning the on-chip port of the second chip with a second optical component, such that the on-chip port of the first chip is aligned with the on-chip port of the second chip via the respective first and second optical components.

14. A method for deflecting an optical component for alignment purposes of the optical component with a further optical component, using an apparatus in accordance with claim 1, wherein the method comprises the steps of:
receiving an optical component in a space between two adjacently placed elongate carriers;
deflecting the two adjacently placed elongate carriers for alignment purposes of the optical component with a further optical component by actuating the piezoelectric material of the two adjacently placed elongate carriers.

15. The method of claim 14, wherein the step of deflecting comprises:
deflecting the two adjacently placed elongate carriers for alignment purposes of the optical component with a further optical component by applying a voltage to the piezoelectric material of the two adjacently placed elongate carriers.

16. The method of claim 14, wherein the elongate carriers are coated with a smoothening material to reduce frictional resistance between the received optical component and the corresponding elongate carriers.

* * * * *